(12) United States Patent
Palanivel et al.

(10) Patent No.: US 10,313,564 B1
(45) Date of Patent: Jun. 4, 2019

(54) METHODS AND SYSTEMS FOR USAGE CONTROL OF PRINTING MATERIAL

(71) Applicant: XEROX CORPORATION, Norwalk, CT (US)

(72) Inventors: Dhevendra Alagan Palanivel, Chennai (IN); Sudhagar Subbaian, Coimbatore (IN); Sainarayanan Gopalakrishnan, Chennai (IN)

(73) Assignee: XEROX CORPORATION, Norwalk, CT (US)

( * ) Notice: Subject to any disclaimer, the term of this patent is extended or adjusted under 35 U.S.C. 154(b) by 0 days.

(21) Appl. No.: 16/009,595

(22) Filed: Jun. 15, 2018

(51) Int. Cl.
G06F 15/00 (2006.01)
G06K 1/00 (2006.01)
H04N 1/60 (2006.01)
H04N 1/23 (2006.01)

(52) U.S. Cl.
CPC .......... H04N 1/605 (2013.01); H04N 1/2346 (2013.01); H04N 1/6072 (2013.01)

(58) Field of Classification Search
CPC .... H04N 1/605; H04N 1/2346; H04N 1/6072; H01H 2203/046; B41F 31/022
See application file for complete search history.

(56) References Cited

U.S. PATENT DOCUMENTS

| | | | | |
|---|---|---|---|---|
| 2002/0054396 | A1* | 5/2002 | Tanaka | H04N 1/40062 358/519 |
| 2004/0123760 | A1* | 7/2004 | Morikawa | B41F 33/0045 101/364 |
| 2006/0227380 | A1* | 10/2006 | Fan | H04N 1/4053 358/3.03 |
| 2015/0346633 | A1* | 12/2015 | Megawa | G03G 15/6529 358/1.1 |

* cited by examiner

Primary Examiner — Moustapha Diaby

(57) ABSTRACT

System(s) and method(s) for controlling a rate of consumption of printing material are described. The method includes receiving an image to be printed or copied and converting the image into a plurality of pixels. A value of a pixel, from among the plurality of pixels, is compared with a predefined threshold value. When the value of the pixel is below the predefined threshold value, a black pixel indicative of a pixel with printing material is generated. An error between the value of the pixel and a value of the black pixel is determined. The error value is multiplied by a gain value and then the weighted value of resultant is distributed among neighborhood pixels. The gain value is varied to control the rate of consumption of the printing material, as the consumption of the printing material is reduced when the gain value is increased.

20 Claims, 7 Drawing Sheets

METHODS AND SYSTEMS FOR USAGE CONTROL OF PRINTING MATERIAL

TECHNICAL FIELD

The present disclosure relates generally relates to the field of printing and/or copying in particular, to methods and systems for controlling a rate of consumption of a printing material such as ink or toner.

BACKGROUND

In the realm of printing, consumption of ink is an important consideration. This becomes even more prominent in case of half-toning operations. As is generally known, half-toning is a reprographic technique of printing that simulates shades of gray by use of tiny black dots arranged in a particular pattern, varying either in size or spacing. Owing to high cost of ink, it is relevant to ensure an optimum utilization of ink in printing operations. Therefore, numerous efforts have been made in order to minimize the consumption of ink while ensuring quality output.

However, existing techniques are mostly focused on reducing dot gain. As is generally known, dot gain is indicative of an increase in the size of a printed dot relative to its intended size. Although such technique provides a certain amount of ink saving, it is primarily intended for dot gain reduction and does not provide flexibility in terms of controlling a rate of consumption of ink for saving purposes.

Further, there are many techniques, such as screening, dithering, and error diffusion that are used for half-toning. There are numerous ink saving techniques developed for the screening technique and the dithering technique. However, in comparison, there are a few ink saving techniques available for the error diffusion technique in spite of the fact that the error diffusion technique offers higher spatial resolution and better quality as compared to the dithering technique. It also eliminates the occurrence of the Moire effect that is produced by superimposing two or more halftone patterns of different color channels. However, there are not many techniques for ink savings using the error diffusion technique, and even those which are available do not provide any control on the rate of consumption of ink. Therefore, there is a need for such methods and systems to overcome the mentioned challenge.

SUMMARY

This summary is provided to introduce concepts related to controlling a rate of consumption of printing material such as ink. These concepts are further described below in the detailed description. This summary is not intended to identify essential features of the claimed subject matter nor is it intended for use in determining or limiting the scope of the claimed subject matter.

According to an embodiment of the present subject matter, a method for controlling a rate of consumption of printing material is described. The method includes receiving an image to be printed or copied. Once received, the image is converted into a plurality of pixels. The plurality of pixels is collectively forming the image. Thereafter, a value of a pixel, from among the plurality of pixels, is compared with a predefined threshold value. When the value of the pixel is below the predefined threshold value, a black pixel indicative of a pixel with the printing material is generated. Then, an error is determined between the value of the pixel and a value of the generated black pixel. The error value is multiplied by a gain value and then the weighted value of resultant is distributed among neighborhood pixels. The gain value is varied to control the rate of consumption of the printing material, as the consumption of the printing material is reduced when the gain value is increased.

According to another embodiment of the present subject matter, a printing material saving system for controlling a rate of consumption of printing material is described. The printing material saving system includes a receiving unit, a generating unit in communication with the receiving unit, and a distributing unit in communication with the receiving unit and the generating unit. The receiving unit receives an image to be printed or copied and converts the image into a plurality of pixels. The plurality of pixels is collectively forming the image. The generating unit compares a value of a pixel, from among the plurality of pixels, with a predefined threshold value, generates a black pixel indicative of a pixel with printing material when the value of the pixel is below the predefined threshold value. The distributing unit determines an error between the value of the pixel and a value of the black pixel. The distributing unit then multiplies the error value with a gain value and then the weighted value of resultant is distributed among neighborhood pixels. The gain value is varied to control the consumption of the printing material.

According to another embodiment of the present subject matter, a multifunction device is described. The multifunction device includes a processor and a printing material saving system in communication with the processor. The printing material saving system receives an image to be printed or copied and converts the image into a plurality of pixels. The plurality of pixels is collectively forming the image. The printing material saving system compares a value of a pixel, from among the plurality of pixels, with a predefined threshold value, and generates a black pixel indicative of a pixel with printing material when the value of the pixel is below the predefined threshold value. The printing material saving system further determines an error between the value of the pixel and a value of the black pixel. The printing material saving system then multiplies the error value with a gain value and then the weighted value of resultant is distributed among neighborhood pixels. The gain value is varied to control the rate of consumption of the printing material.

According to yet another embodiment of the present subject matter, a multifunction device is described. The multifunction device includes a processor and a printing material saving system in communication with the processor. The printing material saving system receives an image to be printed or copied and converts the image into a plurality of pixels. The plurality of pixels is collectively forming the image. The printing material saving system compares a value of a pixel, from among the plurality of pixels, with a predefined threshold value, and generates a black pixel indicative of a pixel with printing material when the value of the pixel is below the predefined threshold value. The printing material saving system further determines an error between the value of the pixel and a value of the black pixel. The printing material saving system then multiplies the error value with a gain value and then the weighted value of resultant is distributed among neighborhood pixels. The gain value is varied to control the rate of consumption of the printing material. Also, when the value of the pixel is above the predefined threshold value, the printing material saving system is further to generate a white pixel indicative of a pixel without printing material, when the value of the pixel is above the predefined threshold value, determine an error between the value of the pixel and a value of the white pixel, and distribute the error among the neighborhood pixels, based on predetermined weighted values assigned to the neighborhood pixels, a predetermined weighted value being indicative of a proportion of the error to be assigned to a neighborhood pixel. The predetermined weighted values are assigned based on the proximity of a neighborhood pixel to the pixel.

Other and further aspects and features of the disclosure will be evident from reading the following detailed description of the embodiments, which are intended to illustrate, not limit, the present disclosure.

BRIEF DESCRIPTION OF THE DRAWINGS

The illustrated embodiments of the subject matter will be best understood by reference to the drawings, wherein like parts are designated by like numerals throughout. The following description is intended only by way of example, and simply illustrates certain selected embodiments of devices, systems, and processes that are consistent with the subject matter as claimed herein.

DESCRIPTION

Figure 1:
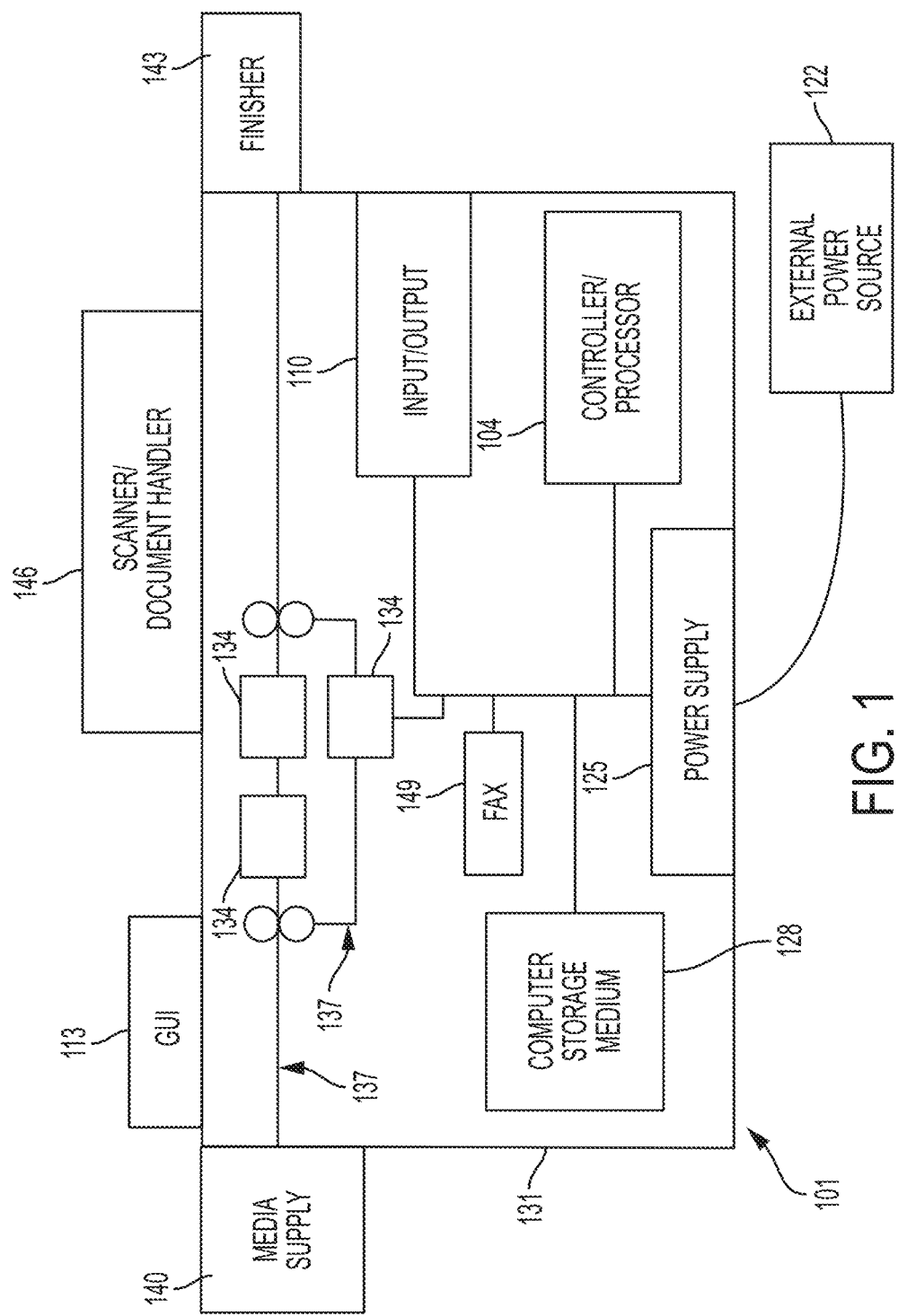
FIG. 1 illustrates a schematic diagram of a multi-function device, according to one or more embodiments of the present disclosure.

A few inventive aspects of the disclosed embodiments are explained in detail below with reference to the various figures. Embodiments are described to illustrate the disclosed subject matter, not to limit its scope, which is defined by the claims. Those of ordinary skill in the art will recognize a number of equivalent variations of the various features provided in the description that follows.

Non-Limiting Definitions

Definitions of one or more terms that will be used in this disclosure are described below without limitations. For a person skilled in the art, it is understood that the definitions are provided just for the sake of clarity and are intended to include more examples than just provided below.

The term "multi-function device" refers to a device or a combination of multiple devices configured to perform one or more functions, but not limited to, scanning, printing, copying, imaging, and so forth. The multi-function device includes software, hardware, firmware, or combination thereof. In the context of the current disclosure, the multi-function device includes one or more modules for controlling rate of consumption of printing material while performing printing or copying operations. More details on the same will be discussed below.

The term "printing material" refers to any marking material or colorant used in digital printing. The marking material may include ink as used in an inkjet context and may include toner as used in a xerographic context.

The term "black pixel" refers to a pixel with printing material or a pixel having a black dot in that spot.

The term "black dot" shall apply to any primary-color printing material used as part of a color printing operation.

The term "white pixel" refers to a pixel without printing material or an absence of the black dot in that spot. A binary image is formed by the combination of the black pixels and the white pixels.

The term "gain" or "gain value" refers to a numeric value indicative of the rate of consumption of printing material. The gain value has to be greater than 1 for material saving. The gain value is controlled to control a rate of consumption of the printing material for material saving.

The term "printing material saving" refers to saving of consumption of the printing material for a printing operation in comparison to consumption of the printing material for the same printing operation without the application of present disclosure. In the description hereinafter, the printing material may refer to ink used in inkjet context, however the term "ink" may include any marking material or colorant used in digital printing and may include toner as used in a xerographic context without departing from the scope of the present disclosure.

The disclosure will now be described by reference to a multi-function device that includes a print engine having a digital image processor. While the disclosure will be described hereinafter in connection with specific systems and methods thereof, it will be understood that limiting the disclosure to such specific systems and methods is not intended. On the contrary, it is intended to cover all alternatives, modifications, and equivalents as may be included within the spirit and scope of the disclosure as defined by the appended claims.

EXEMPLARY EMBODIMENTS

A computer-implemented method for controlling a rate of consumption of a printing material, executed by at least one processor, is disclosed. The method includes receiving an image to be printed or copied. The image is converted into a plurality of pixels, wherein the plurality of pixels is collectively forming the image. A value of a pixel, from among the plurality of pixels is compared, with a predefined threshold value. A black pixel indicative of a pixel with the printing material is generated, when the value of the pixel is below the predefined threshold value. An error is determined between the value of the pixel and a value of the black pixel. Further, a quantization error is determined by multiplying a value of the error with a gain value, wherein the gain value is varied to control the rate of consumption of the printing material. A weighted value of the quantization error is distributed among the neighborhood pixels of the pixel, for generating a printed version or a copied version of the image.

The method includes: assigning the predetermined weighted value to each of the neighborhood pixels, based on the proximity of a neighborhood pixel to the pixel, wherein the predetermined weighted value is indicative of a proportion of the quantization error to be assigned to the neighborhood pixel; and distributing the weighted value of the quantization error among the neighborhood pixels, based on the gain value and predetermined weighted values of the neighborhood pixels.

The method includes: generating a white pixel indicative of a pixel without printing material, when the value of the pixel is above the predefined threshold value; determining an error between the value of the pixel and a value of the white pixel; and distributing the error among the neighborhood pixels, based on predetermined weighted values assigned to the neighborhood pixels, a predetermined weighted value being indicative of a proportion of the error to be assigned to a neighborhood pixel, wherein the predetermined weighted values are assigned based on proximity of a neighborhood pixel to the pixel.

The method further includes: generating the printed version or the copied version of the image, based on the distribution of the error, or a weighted value of the quantization error, among the neighborhood pixels, subsequent to the generation of the black pixel and the white pixel.

The method includes: receiving a selection input from a user, wherein the selection input corresponds to a printing material saving level needed for generating the printed version or the copied version of the image, and wherein each printing material saving level is indicative of a value of the gain.

A printing material saving system for controlling a rate of consumption of printing material, the system includes a receiving unit, a generating unit and a distributing unit. The receiving unit is configured to: receive an image to be printed or copied; and convert the image into a plurality of pixels, wherein the plurality of pixels is collectively forming the image. The generating unit in communication with the receiving unit, the generating unit is configured to: compare a value of a pixel, from among the plurality of pixels, with a predefined threshold value; and generate a black pixel indicative of a pixel with the printing material, when the value of the pixel is below the predefined threshold value. The distributing unit in communication with the receiving unit and the generating unit, the distributing unit is configured to: determine an error between the value of the pixel and a value of the black pixel; further determine a quantization error by multiplying a value of the error with a gain value, wherein the gain value is varied to control the rate of consumption of the printing material; and distribute a weighted value of the quantization error among the neighborhood pixels of the pixel, for generating a printed version or a copied version of the image.

The distributing unit is further configured to: assign a predetermined weighted value to each of the neighborhood pixels, based on the proximity of a neighborhood pixel to the pixel, wherein the predetermined weighted value is indicative of a proportion of the quantization error to be assigned to the neighborhood pixel; and distribute the weighted value of the quantization error among the neighborhood pixels, based on the gain value and predetermined weighted value of the neighborhood pixels.

The generating unit is further configured to generate a white pixel indicative of a pixel without printing material, when the value of the pixel is above the predefined threshold value.

The distributing unit is further configured to: determine an error between the value of the pixel and a value of the white pixel; and distribute the error among the neighborhood pixels, based on predetermined weighted values assigned to the neighborhood pixels, a predetermined weighted value being indicative of a proportion of the error to be assigned to a neighborhood pixel, wherein the predetermined weighted values are assigned based on the proximity of a neighborhood pixel to the pixel.

The printing unit in communication with the receiving unit, the generating unit, and the distributing unit, the printing unit is to: generate the printed version or the copied version of the image, based on the distribution of the error, or a predetermined weighted value of the quantization error, among the neighborhood pixels subsequent to the generation of the black pixel and the white pixel.

The receiving unit is coupled to a user interface to receive a selection input from a user, wherein the selection input corresponds to a printing material saving level needed for generating the printed version or the copied version of the image, and wherein each printing material saving level is indicative of a value of the gain. The gain value is selected to be greater than 1 for saving of the printing material.

A multifunction device is disclosed. The multi-function device includes: a processor: and a printing material saving system in communication with the processor, the printing material saving system to: receive an image to be printed or copied; convert the image into a plurality of pixels, wherein the plurality of pixels is collectively forming the image; compare a value of a pixel, from among the plurality of pixels, with a predefined threshold value; generate a black pixel indicative of a pixel with printing material, when the value of the pixel is below the predefined threshold value; determine an error between the value of the pixel and a value of the black pixel; further determine a quantization error by multiplying a value of the error with a gain value, wherein the gain value is varied to control the rate of consumption of the printing material; and distribute a weighted value of the quantization error among the neighborhood pixels of the pixel, for generating a printed version or a copied version of the image.

The printing material saving system is further configured to: assign a predetermined weighted value to each of the neighborhood pixels, based on proximity of a neighborhood pixel to the pixel, wherein the predetermined weighted value is indicative of a proportion of the error to be assigned to a neighborhood pixel; and distribute the error among the neighborhood pixels, based on the gain value and predetermined weighted values of the neighborhood pixels.

The printing material saving system is further configured to: generate a white pixel indicative of a pixel without printing material, when the value of the pixel is above the predefined threshold value; determine an error between the value of the pixel and a value of the white pixel; and distribute the error among the neighborhood pixels, based on predetermined weighted values assigned to the neighborhood pixels, a predetermined weighted value being indicative of a proportion of the error to be assigned to a neighborhood pixel, wherein the predetermined weighted values are assigned based on the proximity of a neighborhood pixel to the pixel.

The printing material saving system is further configured to: generate the printed version or the copied version of the image, based on the distribution of the error, or a predetermined weighted value of the quantization error, among the neighborhood pixels subsequent to the generation of the black pixel and the white pixel.

The printing material saving system further includes a user interface configured to: receive a selection input from a user, wherein the selection input corresponds to a printing material saving level needed for generating the printed version or the copied version of the image, and wherein each printing material saving level is indicative of a value of the gain.

The gain value is selected to be greater than 1 for saving of the printing material.

According to yet another embodiment of the present subject matter, a multifunction device is described. The multifunction device includes a processor and a printing material saving system in communication with the processor. The printing material saving system receives an image to be printed or copied and converts the image into a plurality of pixels. The plurality of pixels is collectively forming the image. The printing material saving system compares a value of a pixel, from among the plurality of pixels, with a predefined threshold value, and generates a black pixel indicative of a pixel with printing material when the value of the pixel is below the predefined threshold value. The printing material saving system further determines an error between the value of the pixel and a value of the black pixel. The printing material saving system then multiplies the error value with a gain value and then the weighted value of resultant is distributed among neighborhood pixels. The gain value is varied to control the rate of consumption of the printing material. Also, when the value of the pixel is above the predefined threshold value, the printing material saving system is further to generate a white pixel indicative of a pixel without printing material, when the value of the pixel is above the predefined threshold value, determine an error between the value of the pixel and a value of the white pixel, and distribute the error among the neighborhood pixels, based on predetermined weighted values assigned to the neighborhood pixels, a predetermined weighted value being indicative of a proportion of the error to be assigned to a neighborhood pixel. The predetermined weighted values are assigned based on the proximity of a neighborhood pixel to the pixel.

The printing material saving system is further to: assign a predetermined weighted value to each of the neighborhood pixels, based on proximity of a neighborhood pixel to the pixel, wherein the predetermined weighted value is indicative of a proportion of the error to be assigned to a neighborhood pixel; and distribute the error among the neighborhood pixels, based on the gain value and predetermined weighted values of the neighborhood pixels.

Exemplary Environment

FIG. 1 illustrates a multi-function device 101, according to one or more embodiments of the present disclosure. The multi-function device 101 may be used with systems and methods herein. In one embodiment, the multi-function device 101 may be a printer, a copier, and a fax machine. In one embodiment, the multi-function device 101 may be a special purpose machine that includes a specialized image processing card having unique Application Specific Integrated Circuits (ASIC) for providing printing material saving instructions. The multi-function device 101 may also include specialized boards having unique ASICs for input and output devices for faster network communications processing, and a specialized ASIC processor that performs the logic of the methods described herein using dedicated unique hardware logic circuits.

In one embodiment, the multi-function device 101 may include a controller/processor 104 and an input/output device 110 operatively connected to the controller/processor 104. The input/output device 110 may be used for communications to and from the multi-function device 101. Further, the controller/processor 104 may control various actions of the multi-function device 101. In one embodiment, a non-transitory computer storage medium 128 is readable by the controller/processor 104 and may store instructions that the controller/processor 104 executes to allow the multi-function device 101 to perform the various functions, such as those described herein. The non-transitory computer storage medium 128 may be optical, magnetic, and capacitor-based.

According to systems and methods herein, the controller/processor 104 may include a special purpose processor and a dedicated processor. The special purpose processor may be specialized for processing image data. Further, the dedicated processor may include ASICs that are specialized for the handling of printing material saving operations, processing image data, and calculating pixel values.

In one embodiment, the controller/processor 104 may include a Raster Image Processor (RIP). The raster image processor may use an original image description to RIP a print job. Accordingly, print instruction data may be converted to a printer-readable language. Further, a print job description is generally used to generate a ready-to-print file. In one embodiment, the ready-to-print file may be a compressed file that may be repeatedly accessed for multiple passes.

In one embodiment, the multi-function device 101 may also include at least one accessory functional component, such as a graphic user interface assembly (GUI) 113. The GUI 113 may operate on power supplied from an external power source 122 which may provide electrical power through a power supply 125. In one embodiment, the external power source 122 may include, but is not limited to, an alternating current (AC) power source. Further, the power supply 125 may include a power storage element, for example, a battery. The power supply 125 may convert external power into the type of power needed by the various components of the multi-function device 101. In one embodiment, a device housing 131 has one or more functional components that operate on the power supplied from the external power source 122.

The multi-function device 101 may include at least one marking device 134, also referred to as printing engines, operatively connected to the controller/processor 104, and a media path 137 positioned to supply sheets of media from a media supply 140 to the marking device(s) 134 along the media path 137. After receiving various markings from the printing engine(s), the sheets of media may optionally pass to a finisher 143 which may fold, staple, and sort various printed sheets. In addition, the multi-function device 101 may include at least one accessory functional component, such as a scanner/document handler 146 and fax module 149 that also operates on the power supplied from the external power source 122 through the power supply 125. The fax module 149 may operate in conjunction with the scanner/document handler 146.

The scanner/document handler 146 may be an image input device capable of obtaining information from an image. The image input device may include, but is not limited to, a digital document device, a computer system, a memory and storage device, a networked platform, for example, servers and client devices which can obtain pixel values from a source device, and an image capture device. The image capture device may further include, but is not limited to, a scanner, a camera, photography equipment, a facsimile machine, photo reproduction equipment, a digital printing press, and a xerographic device.

As is generally known, the scanner is an image capture device that optically scans images and print media and converts the scanned image into a digitized format. Common scanning devices may include variations of a flatbed scanner, wherein specialized image receptors move beneath a platen and scan the media placed on the platen. On the other hand, modern digital scanners typically incorporate a charge-coupled device (CCD) or a contact image sensor (CIS) as an image sensing receptor(s). The scanning device may produce a signal of scanned image data. Such a digital signal may contain information about pixels, such as color value, intensity, and their location within the scanned image.

Further, an image output device is any device capable of rendering the image. In one embodiment, the image output device may include, but is not limited to, digital document reproduction equipment and other copier systems as are widely known in commerce, photographic production and reproduction equipment, monitors and other displays, and computer workstations and servers, including a wide variety of color marking devices.

In one embodiment, rendering an image may include reducing the image data or a signal thereof to a viewable form, store the image data to memory or a storage device for subsequent retrieval, and communicate the image data to another device. Such communication may take the form of transmitting a digital signal of the image data over a network.

As would be understood by those ordinarily skilled in the art, the multi-function device 101 shown in FIG. 1 is merely exemplary, and the systems and methods herein are equally applicable to other types of printing devices that may include fewer components or more components, without departing from the scope of the present disclosure.

Exemplary System

Figure 2:
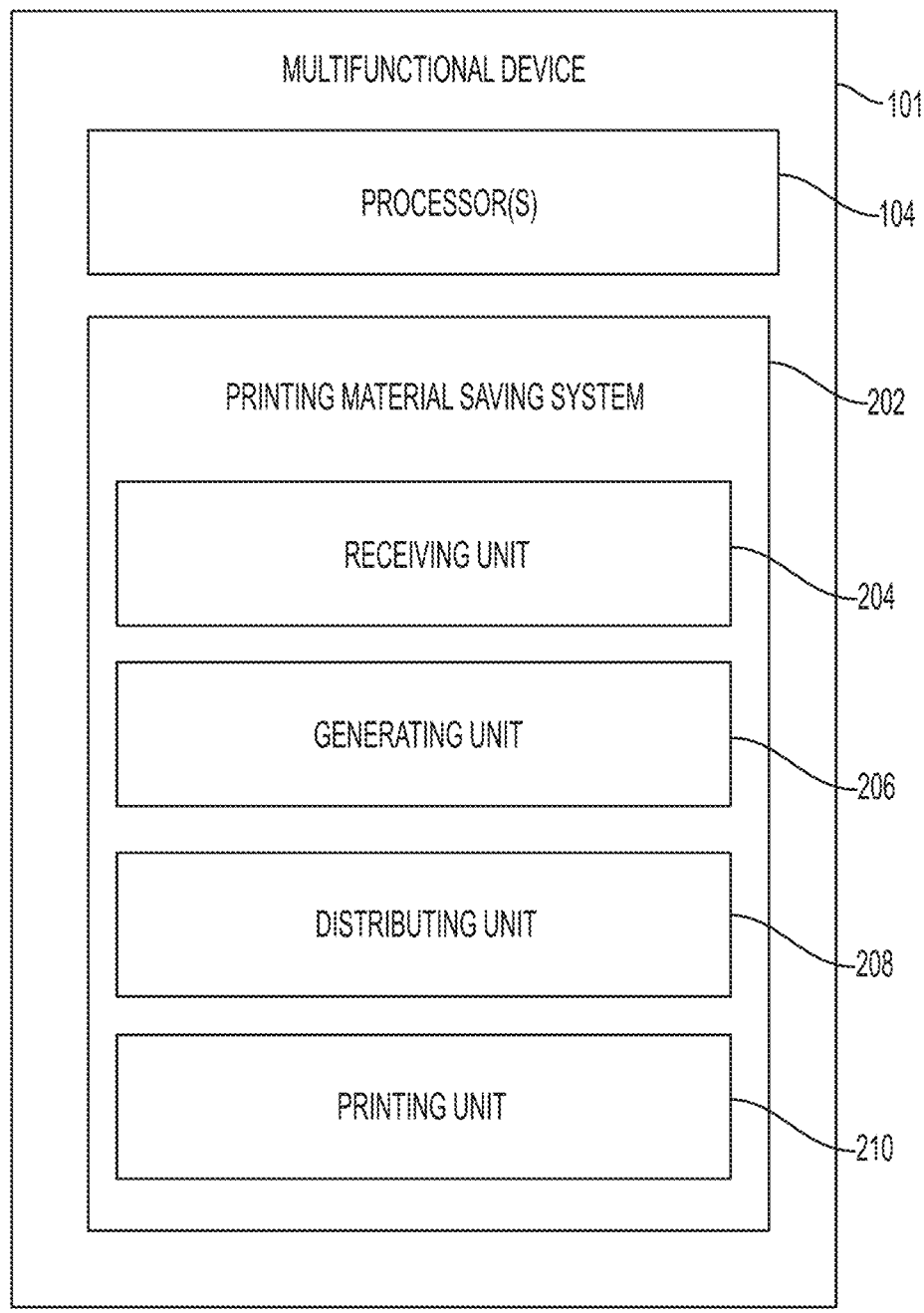
FIG. 2 illustrates another block diagram of the multi-function device including a printing material saving system, according to one or more embodiments of the present disclosure.

FIG. 2 illustrates another block diagram of the multi-function device 101 including a printing material saving system 202, according to one or more embodiments of the present disclosure. For the sake of brevity, features of the disclosure that are already explained in the description of FIG. 1 are not explained in detail in the description of FIG. 2. The printing material saving system 202 may hereinafter interchangeably be referred to as the system 202. The system 202 may be implemented in devices, such as the multifunction device 101, as explained in FIG. 1. According to principles of the present subject matter, the system 202 may operate to control a rate of consumption of the printing material for printing operations. The system 202 may operate for generation of monochrome as well as color prints or copies.

The multi-function device 101 includes the processor 104 and the system 202 in communication with the processor 104. In one embodiment, the system 202 includes a receiving unit 204, a generating unit 206 in communication with the receiving unit 204, a distributing unit 208 in communication with the receiving unit 204 and the generating unit 206, and a printing unit 210 in communication with the receiving unit 204, the generating unit 206, and the distributing unit 208.

In an example, the receiving unit 204, the generating unit 206, the distributing unit 208, and the printing unit 210 may be implemented as one or more microprocessors, microcomputers, microcontrollers, digital signal processors, central processing units, state machines, logic circuitries, configurable hardware units, and/or any devices that manipulate signals based on operational instructions. Among other capabilities, the receiving unit 204, the generating unit 206, the distributing unit 208, and the printing unit 210 are configured to fetch and execute computer-readable instructions and data stored in a storage unit (not shown in the figure).

In one embodiment, the receiving unit 204 receives an image to be printed or copied. Upon receiving the image, the receiving unit 204 converts the image into a plurality of pixels. The plurality of pixels is collectively forming the image.

In one embodiment, the receiving unit 204 obtains image data associated with the image. The image data may include information associated with the plurality of pixels of the image. The image data may be stored in an internal storage of a device in which the system 202 is implemented. In another embodiment, the image data may be obtained from an external storage device communicatively coupled with the device in which the system 202 is implemented. In yet another embodiment, where the device including the system 202 is implemented in a network of computing devices, the image data may be obtained from one of the computing devices presented in the network.

Further, the generating unit 206 implements an error diffusion technique for generation of output pixels, either a black pixel or a white pixel. The error diffusion technique is explained in detail in the subsequent sections of the description. In one embodiment, the generating unit 206 compares a value of a pixel, from among the plurality of pixels, with a predefined threshold value. Based on the comparison, the generating unit 206 generates an output pixel. In one embodiment, when the value of the pixel is determined to be below the threshold value, the generating unit 206 generates a black pixel. The black pixel is indicative of a pixel with the printing material or a pixel having a black dot.

The distributing unit 208 determines an error between the value of the pixel and a value of the black pixel. The error is then multiplied with a gain value to generate a quantization error. In the present disclosure, the error can be referred to as conventional quantization error, and the quantization error can be referred to as modified quantization error. Without departing from the scope of the present disclosure, the gain value can be varied to control the rate of consumption of the printing material, as the consumption of the printing material is reduced when the gain value is increased. Subsequently, the distributing unit 208 distributes a predetermined weighted value of the (modified) quantization error among neighborhood pixels of the pixel, based on a gain value. The gain value is indicative of a rate of printing material saving. Further, the consumption of the printing material is reduced when the gain value is increased. Therefore, as the gain value increases, the rate of consumption of the printing material decreases and consequently, a rate of printing material saving increases. The gain value is varied to control the rate of printing material saving.

In one embodiment, the receiving unit 204 includes a user interface to receive a selection input from a user. The selection input corresponds to a printing material saving level needed for generating the printed version or the copied version of the image, and each printing material saving level is indicative of a value of the gain. In one embodiment, the plurality of gain values may be associated with the saving level based on historical data pertaining to the selection of the saving levels by the user. The user then selects one of the plurality of printing material saving levels for a printing/copying operation. In one embodiment, the printing material saving level may be selected based on a predefined quality of a printed version or a copied version of the image. In one embodiment, the printing material saving level may be so selected that the gain value remains greater than 1 for printing material saving.

In another embodiment, the generating unit 206 processes the selection input received from the user to select an amount of the printing material saving to be defined based on expected image quality of a specific print or copy operation. Based on the selection input of the user, the gain value may be defined for the print or copy operation. In one embodiment, the gain value may be 1 by default. Based on the selection input for the printing material saving level, the generating unit 206 updates the gain value to achieve the selected amount of printing material saving.

In one embodiment, the distributing unit 208 assigns a weighted value to each of the neighborhood pixels. The weighted value is assigned to a neighborhood pixel based on the proximity of the neighborhood pixel to the pixel. The weighted value is indicative of a proportion of the error to be assigned to the neighborhood pixel.

Table 1 illustrates an exemplary matrix showing neighborhood pixel locations with their corresponding weighted values. Table 1 is provided for providing a better understanding and clarity of the present subject matter and should not be construed as limiting. Further, those skilled in the art can appreciate that the matrix shown in Table 1 is one example of weight kernel; however, other available weight kernels can also be implemented in accordance with the present disclosure.

TABLE 1

|      |      | *    | 7/48 | 5/48 |
| ---- | ---- | ---- | ---- | ---- |
| 1/16 | 5/48 | 7/48 | 5/48 | 1/16 |
| 1/48 | 1/16 | 5/48 | 1/16 | 1/48 |

The asterisk (*) shown in the Table 1 is indicative of current pixel. Further, numerical values shown in the neighborhood pixel indicating boxes are indicative of the corresponding weighted values. As can be noticed, weighted values of the pixels closer to the current pixel are more than weighted values of the pixels farther from the current pixel.

Further, in such an embodiment, the distributing unit 208 then distributes the weighted value of the (modified) quantization error among the neighborhood pixels, based on the gain value and weighted values of the neighborhood pixels.

In an alternate embodiment, the generating unit 206 determines that the value of the pixel is above the predefined threshold value. In such an embodiment, the generating unit 206 generates a white pixel. The white pixel is indicative of a pixel without printing material or absence of a black dot in that spot. Subsequently, the distributing unit 208 determines an error between the value of the pixel and a value of the white pixel. Continuing with the present embodiment, the distributing unit 208 distributes the error among the neighborhood pixels, based on the weighted values assigned to the neighborhood pixels.

Further, subsequent to the generation of the black pixel and the white pixel, the printing unit 210 generates the printed version or the copied version of the image. The printing unit 210 generates the printed version or the copied version based on the distribution of the error, or weighted value of the quantization error among the neighborhood pixels.

In terms of computations performed as per the error diffusion technique by the system 202, an image indicated by F=f(i, j), i.e., "F" indicates the image, is an N×M two dimensional matrix of pixels taking real intensities number in the range [0, 1] (1≤i≤N, 1≤j≤M). A binary image indicated by B=b(i, j), i.e., "B" indicates the binary image, is a two dimensional matrix of pixels taking a binary value 0 (black) or 1 (white). It is noted that the binary value may be 1 (black) or 0 (white). The actual binary value representation depends upon whether the printing device is a write black printing device or a write white printing device.

The error diffusion technique is designed to preserve an average intensity level between input and output images by propagating the error, also referred to as quantization error, to unprocessed neighborhood pixels according to some fixed ratios (weighted values). In error diffusion, the pixel values b(i, j) of the binary image is determined in a raster scan order. The value of b(i, j) is determined by simply thresholding as follows:

$$b(i, j) = \begin{cases} 0, & \text{if } f(i, j) \leq 1/2 \\ 1, & \text{if } f(i, j) > 1/2 \end{cases} \quad (1)$$

Conventionally, the quantization error e(i, j) is computed as:

$$e(i,j)=f(i,j)-b(i,j) \quad (2)$$

After computing the quantization error e(i, j) as described above, the quantization error is distributed to a set of unprocessed pixels, for example, the other pixels in the plurality of pixels included in the image data:

$$f(i+k,j+l) \leftarrow f(i+k,j+l)+h(k,l)*e(i,j) \quad (3)$$

Figure 3:
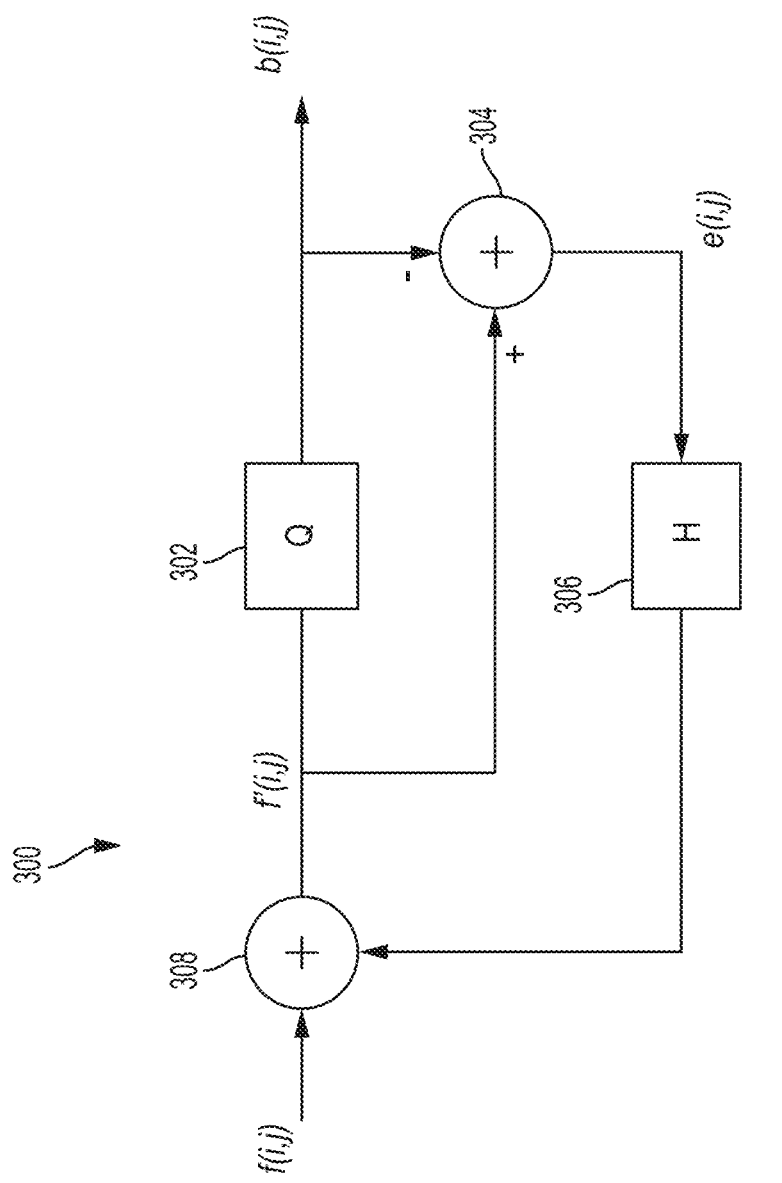
FIG. 3 illustrates a block diagram of the conventional error diffusion technique.

FIG. 3 illustrates a block diagram 300 of the conventional error diffusion technique used by the printing material saving system 202. As illustrated in FIG. 3, a gray scale image data value {circumflex over (f)}(i, j) is received as input 308 and converted (quantized) to a binary image data value b(i, j) by a quantization circuit 302. The binary image data value b(i, j) and the gray scale image data value {circumflex over (f)}(i, j) are received by an error generation circuit (Q) 304 to generate the quantization error e(i, j). The error generation circuit (Q) 304 may be an adder which determines the absolute difference between the binary image data value b(i, j) and the gray scale image data value {circumflex over (f)}(i, j). The quantization error e(i, j) is received by a diffusion circuit (H) 306 which diffuses the quantization error e(i, j) to adjacent pixels based upon the weighted values.

Figure 4:
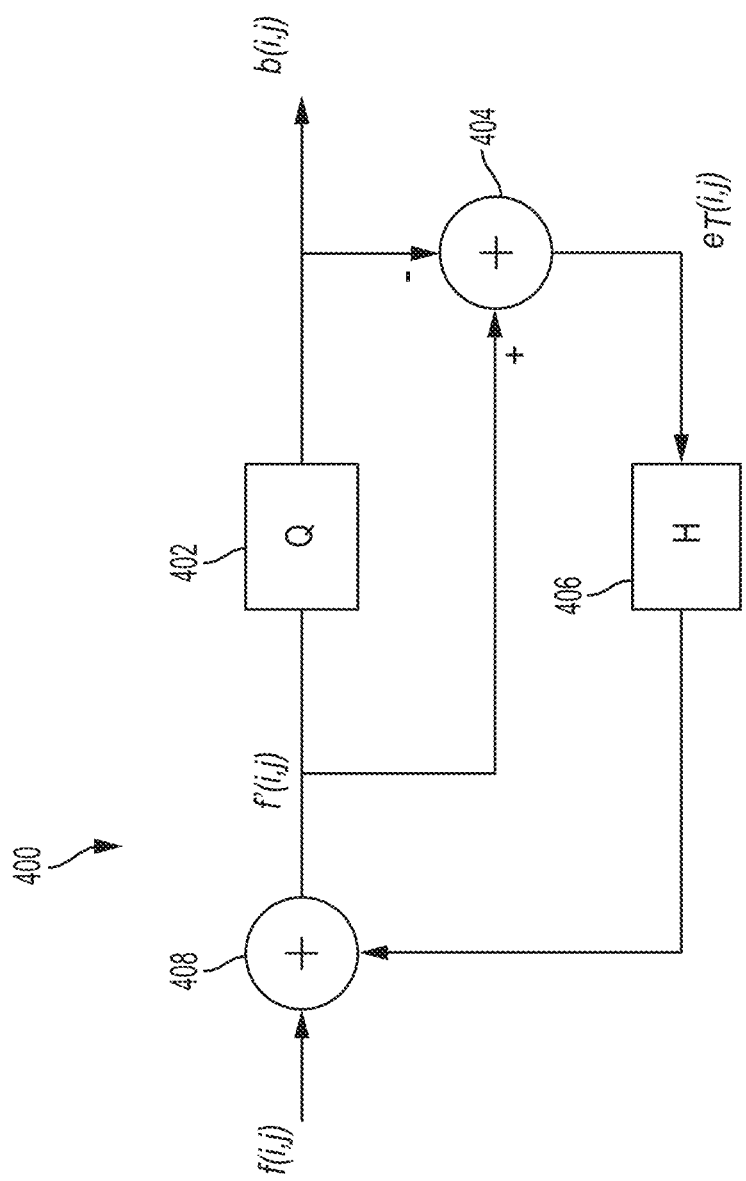
FIG. 4 illustrates a block diagram of an error diffusion technique used by the printing material saving system, according to one or more embodiments of the present disclosure.

FIG. 4 illustrates a block diagram 400 of the error diffusion technique used by the printing material saving system 202, according to one or more embodiments of the present disclosure. For the sake of brevity, features of the disclosure that are already explained in the description of FIG. 1 and FIG. 2 are not explained in detail in the description of FIG. 4. As illustrated in FIG. 4, the distributing unit 208 of the system 202 generates the modified quantization error $e_T(i, j)$ as:

$$e_T(i, j) = \begin{cases} G*(f(i, j) - b(i, j)), & \text{if } f(i, j) \leq 1/2 \\ f(i, j) - b(i, j), & \text{if } f(i, j) > 1/2 \end{cases} \quad (4)$$

"G" in the equation (4) is the gain value. Gain was not utilized in the conventional error diffusion technique mentioned with reference to FIG. 3. Also, those skilled in the art can appreciate that it would not be obvious to introduce gain based on conditions or thresholding as presented in equation (4).

After generating the modified quantization error $e_T(i, j)$ as described above, the distributing unit 208 distributes the modified quantization error $e_T$ to a set of unprocessed pixels, for example, the other pixels in the plurality of pixels included in the image data.

For modified quantization error $e_T$, in FIG. 4, a gray scale image data value {circumflex over (f)}(i, j) is converted (quantized) to a binary image data value b(i, j) by the quantization circuit 402. Those skilled in the art can appreciate that although this example is provided with reference to gray scale image data, but it is equally applicable to the colored image data. Accordingly, the present subject matter is equally applicable to both color and gray scale images.

Continuing with the description of FIG. 4, the binary image data value b(i, j) and the gray scale image data value {circumflex over (f)}(i, j) are received by the error generation circuit 404 to generate the modified quantization error $e_T(i, j)$. The error generation circuit 404 may be an adder which determines the absolute difference between the binary image data value b(i, j) and the gray scale image data value {circumflex over (f)}(i, j). The modified quantization error $e_T(i, j)$ is received by the diffusion circuit (H) 406 which diffuses weighted value of the modified quantization error $e_T(i, j)$ to adjacent pixels. As illustrated, the initial gray scale image data value f(i, j) is modified based upon adding of the weighted value of the modified quantization error $e_T$ received from the diffusion circuit (H) 406 to the initial image data value f(i, j) at an adder 408 to generate {circumflex over (f)}(i, j). Thus, by implementing the error diffusion process/technique in accordance with the method described in accordance with the present subject matter, the system 202 achieves the printing material saving.

In particular, the system 202 reduces dot coverage while rendering the image using the error diffusion technique. The modified error diffusion is generated by multiplying the error diffusion by the gain value, when a drop of the printing material is printed. Thus, when the gain value is greater than one, fewer pixels are marked or fewer drops of the printing material are printed, in turn, saving the printing material.

Exemplary Outputs

Figure 5A:
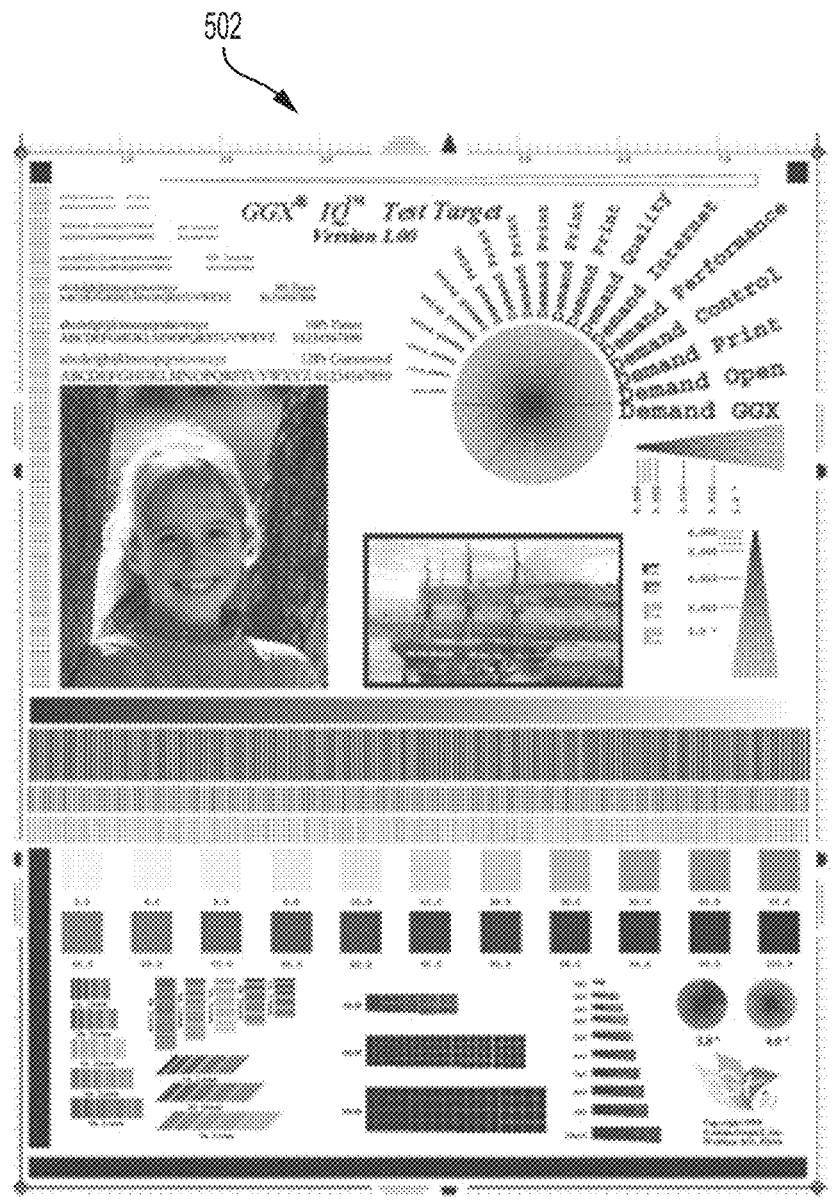
FIGS. 5A-5B illustrate an exemplary output of the multi-function device, according to one or more embodiments of the present subject matter.
Figure 5B:
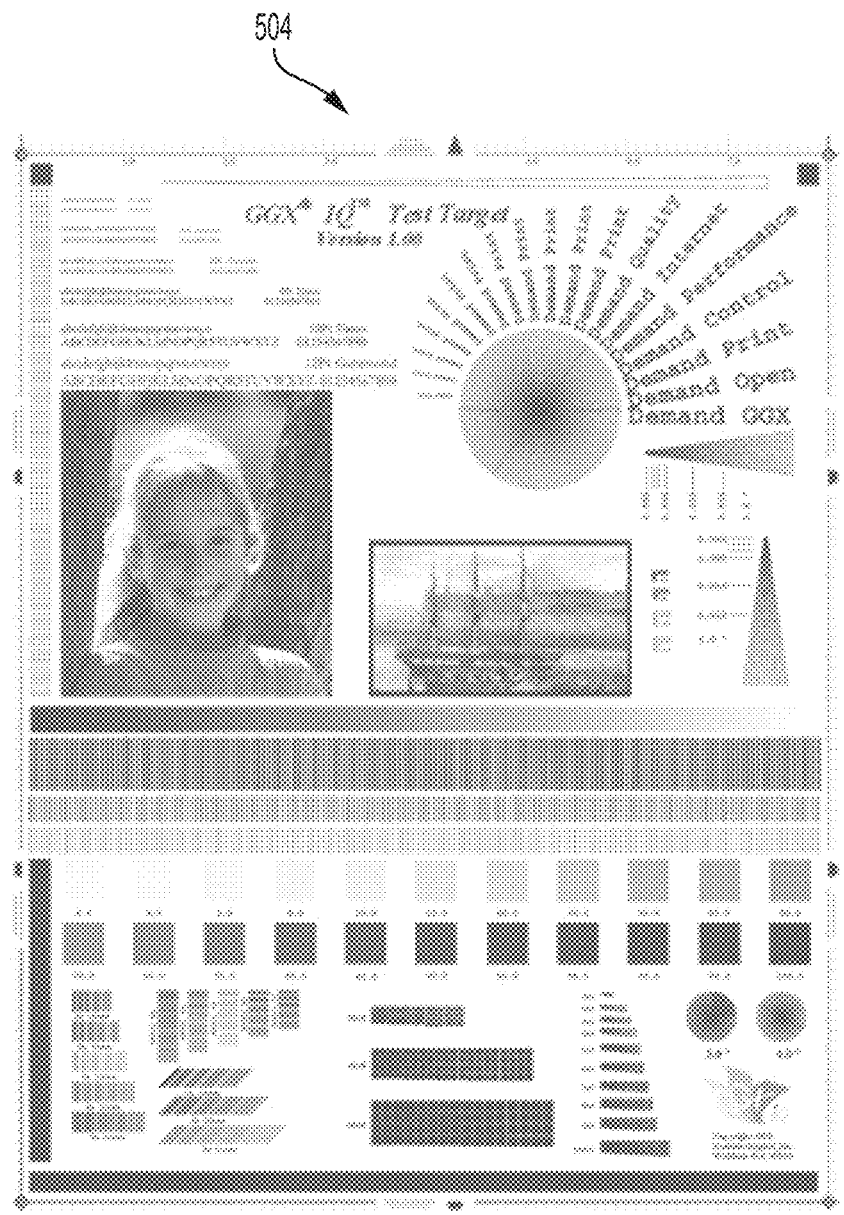

FIG. 5A illustrates an exemplary output of the multi-function device 101 having the system 202, according to one or more embodiments of the present subject matter. For the sake of brevity, features of the disclosure that are already explained in the description of FIG. 1, FIG. 2, and FIG. 4 are not explained in detail in the description of FIG. 5A. FIG. 5A illustrates a printed version (mono output) 502 of an image when the gain value is selected as 1.6. With the gain value of 1.6, the consumption of the printing material can be reduced by 20%. FIG. 5B illustrates a printed version (mono output) 504 of the image when the gain value is selected as 2.85. With the gain value of 2.85, the consumption of the printing material can be reduced by 45%, as consumption of the printing material is reduced when the gain value is increased.

In an experiment with color printing (although not shown) where the gain value is selected as 1.75, with this gain value of 1.75, the consumption of the printing material can be reduced by 25%. With the gain value of 3, the consumption of the printing material can be reduced by 45%.

Exemplary Flowchart

Figure 6:
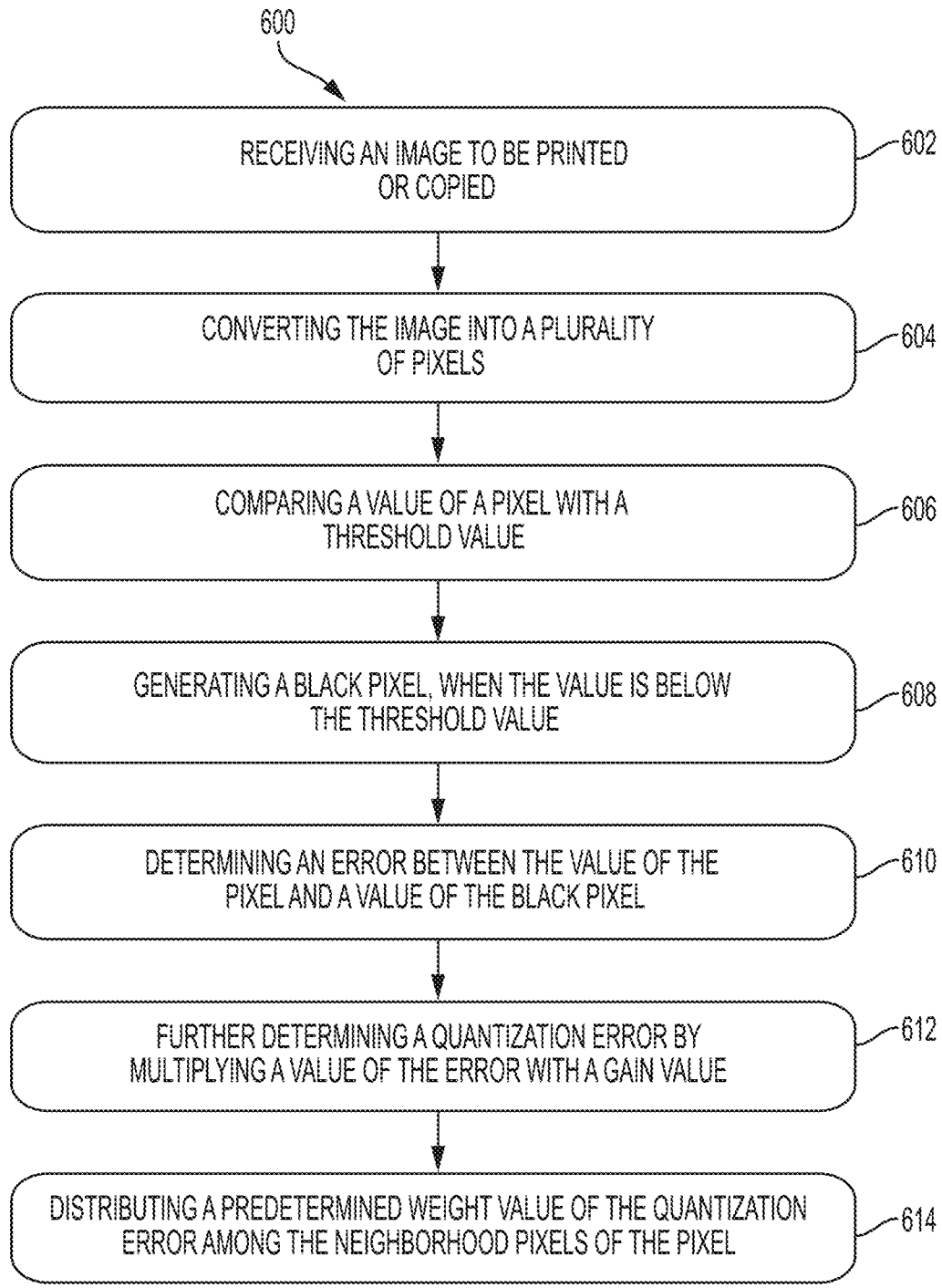
FIG. 6 shows an exemplary method for controlling a rate of consumption of printing material of the multi-function device, according to one or more embodiments of the present subject matter.

FIG. 6 shows an exemplary method for controlling the rate of consumption of the printing material of the multi-function device 101, according to one or more embodiments of the present subject matter. For the sake of brevity, features of the disclosure that are already explained in the description of FIG. 1, FIG. 2, FIG. 4, and FIGS. 5A-5B are not explained in detail in the description of FIG. 6. The order in which the steps of method 600 are described is not intended to be construed as a limitation, and any number of the described method blocks can be combined in any order to implement method 600, or an alternative method. Additionally, individual blocks may be deleted from the method 600 without departing from the spirit and scope of the subject matter described herein. Furthermore, the method 600 may be implemented in any suitable hardware, machine-readable instructions, firmware, or combination thereof.

A person skilled in the art will readily recognize that steps of the method 600 can be performed by programmed computers. Herein, some examples are also intended to cover program storage devices and non-transitory computer-readable medium, for example, digital data storage media, which are machine or computer readable and encode machine-executable or computer-executable instructions, where said instructions perform some or all of the steps of the described method 600. The program storage devices may be, for example, digital memories, magnetic storage media, such as magnetic disks and magnetic tapes, hard drives, or optically readable digital, data storage media.

Referring to FIG. 6, at 602, the method 600 commences with receiving the image to be printed or copied. In one embodiment, the receiving unit 204 of the system 202 receives the image.

At 604, the method 600 includes converting the image into the plurality of pixels. The plurality of pixels is collectively forming the image. In one embodiment, the receiving unit 204 converts the image into the plurality of pixels.

At 606, the method 600 includes comparing a value of a pixel, from among the plurality of pixels, with a predefined threshold value. In one embodiment, the generating unit 206 compares the value of the pixel with the predefined threshold value.

At 608, the method 600 includes generating a black pixel, when the value of the pixel is below the predefined threshold value. In an alternate embodiment, when the value of the pixel is above the predefined threshold value, the method 600 includes generating a white pixel. In one embodiment, the generating unit 206 generates the black pixel and the white pixel.

At 610, the method 600 includes determining the error (quantization error) between the value of the pixel and the value of the black pixel. In case of generation of the white pixel, the method 600 includes determining an error between the value of the pixel and a value of the white pixel. In one embodiment, the distributing unit 208 determines the error.

At 612, the method 600 includes further determining a quantization error (modified quantization error) by multiplying a value of the error with a gain value, where the gain value is varied to control the rate of consumption of the printing material, as the consumption of the printing material is reduced when the gain value is increased.

At 614, the method 600 includes distributing a predetermined weighted value of the quantization error among the neighborhood pixels of the pixel, for generating a printed version or a copied version of the image. In one embodiment, the distributing unit 208 distributes the error among the neighborhood pixels based on the gain value. In case of generation of the white pixel, the method 600 includes distributing the error among the neighborhood pixels, based on the weighted values assigned to the neighborhood pixels.

In one embodiment, the method 600 includes assigning a weighted value to each of the neighborhood pixels, based on the proximity of a neighborhood pixel to the pixel. The weighted value is indicative of a proportion of the error to be assigned to the neighborhood pixel. In such an embodiment, the method 600 further includes distributing the error among the neighborhood pixels, based on the gain value and the weighted values of the neighborhood pixels.

In one embodiment, subsequent to the generation of the black pixel and the white pixel, the method 600 includes generating the printed version or the copied version of the image, based on the distribution of the error among the neighborhood pixels.

In one embodiment, the method 600 includes receiving the gain value from the user. The gain value may be selected based on a predefined quality of the printed version or the copied version of the image.

The system 202 and the method 600 of the present disclosure offer a comprehensive and effective approach for controlling the rate of the consumption of the printing material. Firstly, the present approach is focused on saving of printing material. Further, the error diffusion-based printing material saving approach in comparison to conventional half-toning methods offers a better quality and spatial resolution as compared to other half-toning techniques, such as ordered dithering. The present approach also eliminates the possibility of Moire effect occurring due to overlapping of color planes.

The rate of the consumption of the printing material or the rate of saving of the printing material can be dynamically adjusted at any time. Further, the system 202 provides better contrast, sharpness, and retention of lighter shades or fine details resulting in a better image quality. Also, the system 202 is flexible in terms of implementation as it just introduces the gain value in already existing computations. Therefore, the present disclosure offers a comprehensive, effective, and flexible technique for saving of the printing material while ensuring a high-quality output.

Described and illustrated herein are examples of the disclosure along with some variations. The terms, descriptions and figures used herein are set forth by way of illustration only and are not meant as limitations. Many variations are possible within the scope of the disclosure, which is intended to be defined by the following claims and their equivalents in which all terms are meant in their broadest reasonable sense unless otherwise indicated.

For a person skilled in the art, it is understood that the use of phrase(s) "is", "are", "may", "can", "could", "will", "should" or the like is for understanding various embodiments of the present disclosure and the phrases do not limit the disclosure or its implementation in any manner.

It is emphasized that the term "comprises" or "comprising" is used in this specification to specify the presence of stated features, integers, steps or components, but does not preclude the addition of one or more further features, integers, steps or components, or groups thereof.

The order in which the method is described is not intended to be construed as a limitation, and any number of the described method blocks can be combined in any order to implement the method or alternate methods. Additionally, individual blocks may be deleted from the method without departing from the spirit and scope of the subject matter described herein. Furthermore, the method can be implemented in any suitable hardware, software, firmware, or combination thereof. However, for ease of explanation, in the embodiments described below, the method may be considered to be implemented in the above-described system and/or the apparatus and/or any electronic device (not shown).

The above description does not provide specific details of manufacture or design of the various components. Those of skill in the art are familiar with such details, and unless departures from those techniques are set out, techniques, known, related art or later developed designs and materials should be employed. Those in the art are capable of choosing suitable manufacturing and design details.

Note that throughout the following discussion, numerous references may be made regarding servers, services, engines, modules, interfaces, portals, platforms, or other systems formed from computing devices. It should be appreciated that the use of such terms are deemed to represent one or more computing devices having at least one processor configured to or programmed to execute software instructions stored on a computer-readable tangible, non-transitory medium or also referred to as a processor-readable medium. For example, a server can include one or more computers operating as a web server, database server, or another type of computer server in a manner to fulfill described roles, responsibilities, or functions. Within the context of this document, the disclosed devices or systems are also deemed to comprise computing devices having a processor and a non-transitory memory storing instructions executable by the processor that cause the device to control, manage, or otherwise manipulate the features of the devices or systems.

Some portions of the detailed description herein are presented in terms of algorithms and symbolic representations of operations on data bits performed by conventional computer components, including a central processing unit (CPU), memory storage devices for the CPU, and connected display devices. These algorithmic descriptions and representations are the means used by those skilled in the data processing arts to most effectively convey the substance of their work to others skilled in the art. An algorithm is generally perceived as a self-consistent sequence of steps leading to the desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be understood, however, that all of these and similar terms are to be associated with the appropriate physical quantities and are merely convenient labels applied to these quantities. Unless specifically stated otherwise, as apparent from the discussion herein, it is appreciated that throughout the description, discussions utilizing terms such as "determining," or "assigning," or "generating," or "distributing," or, "converting," "receiving," or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The exemplary embodiment also relates to an apparatus for performing the operations discussed herein. This apparatus may be specially constructed for the required purposes, or it may comprise a general-purpose computer selectively activated or reconfigured by a computer program stored in the computer. Such a computer program may be stored in a computer-readable storage medium, such as, but is not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus.

The algorithms and displays presented herein are not inherently related to any particular computer or other apparatus. Various general-purpose systems may be used with programs in accordance with the teachings herein, or it may prove convenient to construct more specialized apparatus to perform the methods described herein. The structure for a variety of these systems is apparent from the description above. In addition, the exemplary embodiment is not described with reference to any particular programming language. It will be appreciated that a variety of programming languages may be used to implement the teachings of the exemplary embodiment as described herein.

The methods illustrated throughout the specification may be implemented in a computer program product that may be executed on a computer. The computer program product may comprise a non-transitory computer-readable recording medium on which a control program is recorded, such as a disk, hard drive, or the like. Common forms of non-transitory computer-readable media include, for example, floppy disks, flexible disks, hard disks, magnetic tape, or any other magnetic storage medium, CD-ROM, DVD, or any other optical medium, a RAM, a PROM, an EPROM, a FLASH-EPROM, or other memory chip or cartridge, or any other tangible medium from which a computer can read and use.

Alternatively, the method may be implemented in transitory media, such as a transmittable carrier wave in which the control program is embodied as a data signal using transmission media, such as acoustic or light waves, such as those generated during radio wave and infrared data communications, and the like.

The terminology used herein is for the purpose of describing particular embodiments only and is not intended to be limiting of the disclosure. It will be appreciated that several of the above-disclosed and other features and functions, or alternatives thereof, may be combined into other systems or applications. Various presently unforeseen or unanticipated alternatives, modifications, variations, or improvements therein may subsequently be made by those skilled in the art without departing from the scope of the present disclosure as encompassed by the following claims.

The claims, as originally presented and as they may be amended, encompass variations, alternatives, modifications, improvements, equivalents, and substantial equivalents of the embodiments and teachings disclosed herein, including those that are presently unforeseen or unappreciated, and that, for example, may arise from applicants/patentees and others.

It will be appreciated that variants of the above-disclosed and other features and functions, or alternatives thereof, may be combined into many other different systems or applications. Various presently unforeseen or unanticipated alternatives, modifications, variations, or improvements therein may be subsequently made by those skilled in the art which are also intended to be encompassed by the following claims.

What is claimed is:

1. A computer-implemented method for controlling a rate of consumption of a printing material, executed by at least one processor, the method comprising:
   receiving an image to be printed or copied;
   converting the image into a plurality of pixels, wherein the plurality of pixels is collectively forming the image;
   comparing a value of a pixel, from among the plurality of pixels, with a predefined threshold value;
   generating a black pixel indicative of a pixel with the printing material, when the value of the pixel is below the predefined threshold value;
   determining an error between the value of the pixel and a value of the black pixel;
   further determining a quantization error by multiplying a value of the error with a gain value, wherein the gain value is varied to control the rate of consumption of the printing material; and
   distributing a weighted value of the quantization error among neighborhood pixels of the pixel, for generating a printed version or a copied version of the image.

2. The method as claimed in claim 1, further comprising:
   assigning a predetermined weighted value to each of the neighborhood pixels, based on a proximity of a neighborhood pixel to the pixel, wherein the predetermined weighted value is indicative of a proportion of the quantization error to be assigned to the neighborhood pixel; and
   distributing the weighted value of the quantization error among the neighborhood pixels, based on the gain value and predetermined weighted values of the neighborhood pixels.

3. The method as claimed in claim 1, further comprising:
   generating a white pixel indicative of a pixel without printing material, when the value of the pixel is above the predefined threshold value;
   determining an error between the value of the pixel and a value of the white pixel; and
   distributing the error among the neighborhood pixels, based on predetermined weighted values assigned to the neighborhood pixels, a predetermined weighted value being indicative of a proportion of the error to be assigned to a neighborhood pixel, wherein the predetermined weighted values are assigned based on proximity of a neighborhood pixel to the pixel.

4. The method as claimed in claim 3, further comprising:
   generating the printed version or the copied version of the image, based on the distribution of the error, or a weighted value of the quantization error, among the neighborhood pixels, subsequent to the generation of the black pixel and the white pixel.

5. The method as claimed in claim 1, further comprising:
   receiving a selection input from a user, wherein the selection input corresponds to a printing material saving level needed for generating the printed version or the copied version of the image, and wherein each printing material saving level is indicative of a value of the gain.

6. A printing material saving system for controlling a rate of consumption of printing material, the system comprising:
   a receiving unit to:
      receive an image to be printed or copied; and
      convert the image into a plurality of pixels, wherein the plurality of pixels is collectively forming the image;
   a generating unit in communication with the receiving unit, the generating unit to:
      compare a value of a pixel, from among the plurality of pixels, with a predefined threshold value; and
      generate a black pixel indicative of a pixel with the printing material, when the value of the pixel is below the predefined threshold value; and
   a distributing unit in communication with the receiving unit and the generating unit, the distributing unit to:
      determine an error between the value of the pixel and a value of the black pixel;
      further determine a quantization error by multiplying a value of the error with a gain value, wherein the gain value is varied to control the rate of consumption of the printing material; and distribute a weighted value of the quantization error among the neighborhood pixels of the pixel, for generating a printed version or a copied version of the image.

7. The system as claimed in claim 6, wherein the distributing unit is further to:
assign a predetermined weighted value to each of the neighborhood pixels, based on the proximity of a neighborhood pixel to the pixel, wherein the predetermined weighted value is indicative of a proportion of the quantization error to be assigned to the neighborhood pixel; and
distribute the weighted value of the quantization error among the neighborhood pixels, based on the gain value and predetermined weighted value of the neighborhood pixels.

8. The system as claimed in claim 6, wherein the generating unit is further to generate a white pixel indicative of a pixel without printing material, when the value of the pixel is above the predefined threshold value.

9. The system as claimed in claim 8, wherein the distributing unit is further to:
determine an error between the value of the pixel and a value of the white pixel; and
distribute the error among the neighborhood pixels, based on predetermined weighted values assigned to the neighborhood pixels, a predetermined weighted value being indicative of a proportion of the error to be assigned to a neighborhood pixel, wherein the predetermined weighted values are assigned based on the proximity of a neighborhood pixel to the pixel.

10. The system as claimed in claim 9, further comprising a printing unit in communication with the receiving unit, the generating unit, and the distributing unit, the printing unit is to:
generate the printed version or the copied version of the image, based on the distribution of the error, or a predetermined weighted value of the quantization error, among the neighborhood pixels subsequent to the generation of the black pixel and the white pixel.

11. The system as claimed in claim 6, wherein the receiving unit is coupled to a user interface to receive a selection input from a user, wherein the selection input corresponds to a printing material saving level needed for generating the printed version or the copied version of the image, and wherein each printing material saving level is indicative of a value of the gain.

12. The system as claimed in claim 6, wherein the gain value is selected to be greater than 1 for saving of the printing material.

13. A multifunction device comprising:
a processor; and
a printing material saving system in communication with the processor, the printing material saving system to:
receive an image to be printed or copied;
convert the image into a plurality of pixels, wherein the plurality of pixels is collectively forming the image;
compare a value of a pixel, from among the plurality of pixels, with a predefined threshold value;
generate a black pixel indicative of a pixel with printing material, when the value of the pixel is below the predefined threshold value;
determine an error between the value of the pixel and a value of the black pixel;

further determine a quantization error by multiplying a value of the error with a gain value, wherein the gain value is varied to control a rate of consumption of the printing material; and
distribute a weighted value of the quantization error among neighborhood pixels of the pixel, for generating a printed version or a copied version of the image.

14. The multifunction device as claimed in claim 13, wherein the printing material saving system is further to:
assign a predetermined weighted value to each of the neighborhood pixels, based on proximity of a neighborhood pixel to the pixel, wherein the predetermined weighted value is indicative of a proportion of the error to be assigned to a neighborhood pixel; and
distribute the error among the neighborhood pixels, based on the gain value and predetermined weighted values of the neighborhood pixels.

15. The multifunction device as claimed in claim 13, wherein the printing material saving system is further to:
generate a white pixel indicative of a pixel without printing material, when the value of the pixel is above the predefined threshold value;
determine an error between the value of the pixel and a value of the white pixel; and
distribute the error among the neighborhood pixels, based on predetermined weighted values assigned to the neighborhood pixels, a predetermined weighted value being indicative of a proportion of the error to be assigned to a neighborhood pixel, wherein the predetermined weighted values are assigned based on the proximity of a neighborhood pixel to the pixel.

16. The multifunction device as claimed in claim 15, wherein the printing material saving system is further to:
generate the printed version or the copied version of the image, based on the distribution of the error, or a predetermined weighted value of the quantization error, among the neighborhood pixels subsequent to the generation of the black pixel and the white pixel.

17. The multifunction device as claimed in claim 13, wherein the printing material saving system further comprising a user interface to:
receive a selection input from a user, wherein the selection input corresponds to a printing material saving level needed for generating the printed version or the copied version of the image, and wherein each printing material saving level is indicative of a value of the gain.

18. The multifunction device as claimed in claim 13, wherein the gain value is selected to be greater than 1 for saving of the printing material.

19. A multifunction device comprising:
a processor; and
a printing material saving system in communication with the processor, the printing material saving system to:
receive an image to be printed or copied;
convert the image into a plurality of pixels, wherein the plurality of pixels is collectively forming the image;
compare a value of a pixel, from among the plurality of pixels, with a predefined threshold value;
generate a black pixel indicative of a pixel with printing material, when the value of the pixel is below the predefined threshold value;
determine an error between the value of the pixel and a value of the black pixel;

further determine a quantization error by multiplying a value of the error with a gain value, wherein the gain value is varied to control a rate of consumption of the printing material; and distribute a weighted value of the quantization error among neighborhood pixels of the pixel, for generating a printed version or a copied version of the image;

wherein the printing material saving system is further to:

generate a white pixel indicative of a pixel without printing material, when the value of the pixel is above the predefined threshold value;

determine an error between the value of the pixel and a value of the white pixel; and distribute the error among the neighborhood pixels, based on predetermined weighted values assigned to the neighborhood pixels, a predetermined weighted value being indicative of a proportion of the error to be assigned to a neighborhood pixel, wherein the predetermined weighted values are assigned based on a proximity of a neighborhood pixel to the pixel.

20. The multifunction device as claimed in claim 19, wherein the printing material saving system is further to:

assign a predetermined weighted value to each of the neighborhood pixels, based on proximity of a neighborhood pixel to the pixel, wherein the predetermined weighted value is indicative of a proportion of the error to be assigned to a neighborhood pixel; and distribute the error among the neighborhood pixels, based on the gain value and predetermined weighted values of the neighborhood pixels.

* * * * *